June 23, 1925.
J. F. TEETER
1,543,037
ADJUSTABLE LIGHT FIXTURE
Filed July 12, 1923
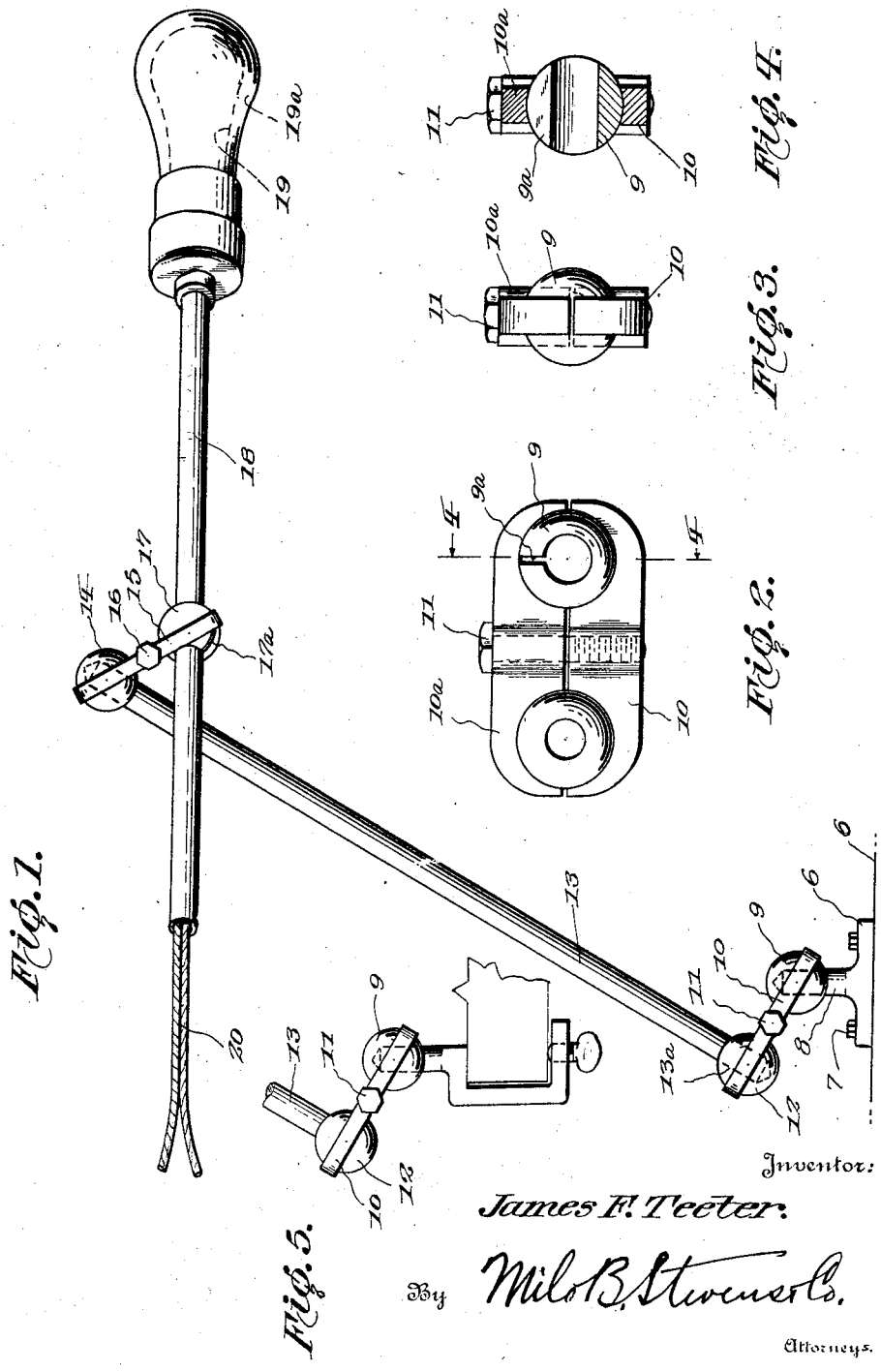
Inventor:
James F. Teeter.
By Milo B. Stevens Co.
Attorneys.

Patented June 23, 1925.

1,543,037

UNITED STATES PATENT OFFICE.

JAMES F. TEETER, OF FOREST PARK, ILLINOIS.

ADJUSTABLE LIGHT FIXTURE.

Application filed July 12, 1923. Serial No. 651,113.

*To all whom it may concern:*

Be it known that I, JAMES F. TEETER, a citizen of the United States, residing at Forest Park, in the county of Cook and State of Illinois, have invented new and useful Improvements in Adjustable Light Fixtures, of which the following is a specification.

My invention relates to adjustable supports for electric lamps, and more particularly to such as are especially adapted for use upon work benches and the like.

Adjustable lamp supports which are commonly used upon machinery, benches and similar objects which are under constant vibration, require a great deal of attention in order to keep them in a desired adjustment. Also, repeated use of such supports results in looseness at the several joints necessitating frequent replacement or tightening thereof. It is therefore the primary object of my present invention to provide a lamp support of this character which is susceptible of repeated adjustment and continued use in connection with vibrating machines or benches without necessitating readjustment or attention.

A further object of the invention resides in certain novel features of construction and arrangement of the various parts whereby a universally adjustable support is provided, without necessitating the use of tightening screws or similar elements in immediate association with the dirigible elements thereof.

A still further object of the invention is to furnish a support of this kind which will be strong and durable in construction, highly convenient in use, and which may be cheaply manufactured.

The above and other objects to be developed during the course of the detailed description appearing hereinafter, are attained by a novel combination and arrangement of parts which will be better understood upon reference to the accompanying drawing forming a part of this specification, and wherein a preferred embodiment of the invention is disclosed.

In the drawing,

Figure 1 is an elevation of a support constructed in accordance with my invention, Fig. 2 is a plan view of one of the clamping and adjustable units;

Fig. 3 is an end elevation thereof;

Fig. 4 is a sectional on the line 4—4 of Fig. 2, and

Fig. 5 is an elevation of a modified form of the invention.

Referring specifically to the drawing, wherein like characters of reference have been used throughout to designate similar parts, numeral 5 denotes a portion of a bench or similar support upon which the base 6 of my adjustable lamp support is secured by means of screws or other fastening elements 7.

The base 6 is provided with a medial projecting stud 8, which is adapted to be received within an aperture of a spherical element or ball joint 9, which latter is received within the opposed recesses of a pair of clamping members 10 and 10$^a$. As shown in Fig. 4 the gripping walls of these recessed clamping members 12 are arcuate in cross section to conform to the spherical contour of the ball elements 9 so that the same may be adjusted between the two clamping elements without being displaced therefrom. The two clamping elements 10 and 10$^a$ are held in clamping position by means of a screw 11 passing through a bearing in the clamping element 10$^a$ and engageable in a tapped recess is the clamping element 10 as shown in Fig. 2. The opposite ends of the clamping members 10 and 10$^a$ are also provided with a pair of recesses similar to those described in connection with the ball 9, for the reception of a similar ball 12 which latter is provided with an aperture or recess for the reception of the end 13$^a$ of a supporting rod 13, which latter carries upon its other end a similar ball 14.

The ball 14 is also clamped between a pair of clamping elements 15 which are similar to the clamping elements 10 and 10$^a$, a bolt 16 passing edgewise through both of the clamps serving to maintain them in clamping relation in the same manner as previously described in connection with the clamps 10 and 10$^a$. The clamping members 15 also are provided with recesses to engage a second spherical member or ball 17, which latter is however provided with a split 17$^a$ as shown in Figs. 1, 2 and 4.

This ball 17 is centrally open to permit the passage of a pipe 18 which carries the electric lamp 19, and also forms a conduit for the electric light wires 20. The lamp 19 is shown encased in a standard form of shade 19ª. The purpose of the split 17ª in the ball 17 is to permit a more or less yieldable clamp upon the tube 18 to permit it to be inserted or retracted as desired, it being understood however that the split portion 17ª will furnish a sufficiently resilient clamp upon the tube 18 as to hold it in a desired position.

It will be readily appreciated that the ball joint receiving members 10, 10ª and 17 serve to hold the lamp in a desired position, yet without resisting readjustment or moving thereof, as required. This construction obviates the necessity of clamping screws at the point of adjustment. By doing away with screws at the immediate point of dirigible movement, the strain of movement of the parts will not result in a looseness of the screw. The fastening bolts 11 and 16 for the respective clamping members will therefore not bear directly the strain of movement of the several balls and for this reason will retain their adjustment for long periods of time even when used in connection with a more or less vibratory support.

Since the recesses of the clamping members 10, 10ª and 15, are each semicircular in form, they form when in clamping position around the balls, a complete annular pocket for the reception thereof, thus strengthening the structure and distributing the gripping surface over considerable area which tends to the production of increased stability and durability to the support.

I claim:

A lamp support comprising pairs of clamping elements, the clamping elements of each pair being flat and arranged in edge to edge relation and formed intermediate the ends thereof with alined openings, the edge portions of said clamping elements being provided in their opposed sides with pairs of recesses, the walls of which are curved longitudinally and transversely, a supporting rod having spherical heads received in certain of said recesses, and spherical attaching heads received in the other recesses of said clamping elements and having radial incisions, the side walls of which are normally spaced whereby the second-named heads may be compressed into gripping engagement with objects extended through the second-named spherical heads, and screw bolts extended through said alined openings for drawing the clamping elements together in clamping engagement with the first and second-named heads, said spherical heads being substantially greater in diameter than the thickness of said clamping elements.

In testimony whereof I affix my signature.

JAMES F. TEETER.